US012602357B1

(12) United States Patent
Chow et al.

(10) Patent No.: US 12,602,357 B1
(45) Date of Patent: Apr. 14, 2026

(54) AUTOMATING DATA PREPROCESSING CODE GENERATION USING LARGE LANGUAGE MODELS

(71) Applicant: SAP SE, Walldorf (DE)

(72) Inventors: Yee Sen Chow, Singapore (SG); Kenneth Tan, Singapore (SG); Xingce Bao, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/989,068

(22) Filed: Dec. 20, 2024

(51) Int. Cl.
*G06F 16/21* (2019.01)

(52) U.S. Cl.
CPC .......... *G06F 16/214* (2019.01); *G06F 16/211* (2019.01)

(58) Field of Classification Search
CPC .............................. G06F 16/214; G06F 16/211
See application file for complete search history.

(56) References Cited

U.S. PATENT DOCUMENTS

| | | | | |
|---|---|---|---|---|
| 12,386,850 | B1* | 8/2025 | Sengupta .............. | G06F 16/258 |
| 2017/0249326 | A1* | 8/2017 | Yamamoto ......... | G06Q 30/0202 |
| 2017/0364539 | A1* | 12/2017 | Jacob ................ | G06F 16/24547 |
| 2024/0411957 | A1* | 12/2024 | Warnick .................. | G06F 30/20 |
| 2025/0045023 | A1* | 2/2025 | Chakhvadze ............. | G06F 8/70 |
| 2025/0045025 | A1* | 2/2025 | Chakhvadze ............. | G06F 8/36 |

* cited by examiner

*Primary Examiner* — Tyler J Torgrimson
(74) *Attorney, Agent, or Firm* — Fish & Richardson P.C.

(57) ABSTRACT

Methods, systems, and computer-readable storage media for receiving a first source data schema (SDS) representing a first format for recording data in a computer-readable document, providing a first prompt including at least a portion of the first SDS, generating description data by processing the first prompt using a first LLM, providing a second prompt including of at least a portion of the first SDS, at least a portion of a first target data schema (TDS), and the description data, generating first schema conversion code (SCC) by processing the second prompt using a second LLM, converting a first document from the first SDS to the first TDS using the first SCC, processing the first document in the first TDS using a ML model to provide inference results, and automatically executing one or more tasks responsive to the inference results.

20 Claims, 6 Drawing Sheets

200

| Bank Statement ID | Company Code | Amount | Currency | Partner Name | Note |
|---|---|---|---|---|---|
| 1000 | CC1 | 990 | EUR | ACME | 1000789 |
| 2000 | CC2 | 2000 | USD | | 90011 876, 895 REF Soylent |
| ... | ... | ... | ... | ... | ... |

202

| Document # | Company Code | Amount | Currency | Organization |
|---|---|---|---|---|
| 10000789 | CC1 | 1000 | EUR | ACME |
| 90011876 | CC2 | 1200 | USD | Soylent |
| 90011898 | CC2 | 800 | USD | Soylent |
| 10000790 | CC1 | 1100 | EUR | ACME |
| ... | ... | ... | ... | ... |

?

AUTOMATING DATA PREPROCESSING CODE GENERATION USING LARGE LANGUAGE MODELS

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some tasks based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

SUMMARY

Implementations of the present disclosure are directed to managing disparate data schemas in machine learning (ML)-based automated decision-making systems. More particularly, implementations of the present disclosure are directed to leveraging one or more large language models (LLMs) to generate computer-executable schema conversion code for converting documents in source data schemas to target data schemas for processing in ML-based automated decision-making systems.

In some implementations, actions include receiving a first source data schema (SDS) representing a first format for recording data in a computer-readable document, providing a first prompt including at least a portion of the first SDS, generating description data by processing the first prompt using a first LLM, providing a second prompt including of at least a portion of the first SDS, at least a portion of a first target data schema (TDS), and the description data, generating first schema conversion code (SCC) by processing the second prompt using a second LLM, converting a first document from the first SDS to the first TDS using the first SCC, processing the first document in the first TDS using a ML model to provide inference results, and automatically executing one or more tasks responsive to the inference results. Other implementations of this aspect include corresponding systems, apparatus, and computer programs, configured to perform the actions of the methods, encoded on computer storage devices.

These and other implementations can each optionally include one or more of the following features: converting the first document from the first SDS to the first TDS includes changing a column name of the first document; the first prompt includes a request to generate descriptions for each column in a set of columns of the first SDS; the second prompt includes a request to generated the first SCC based on the at least a portion of the first SDS, the at least a portion of a first TDS, and the description data; the inference results are provided by the ML model further based on a second document in a second TDS; actions further include converting the second document from a second SDS to the second TDS using second SCC; and the ML model includes a generic line-item matching (GLIM) model that predicts matches between line items of the first document to line items of a second document.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
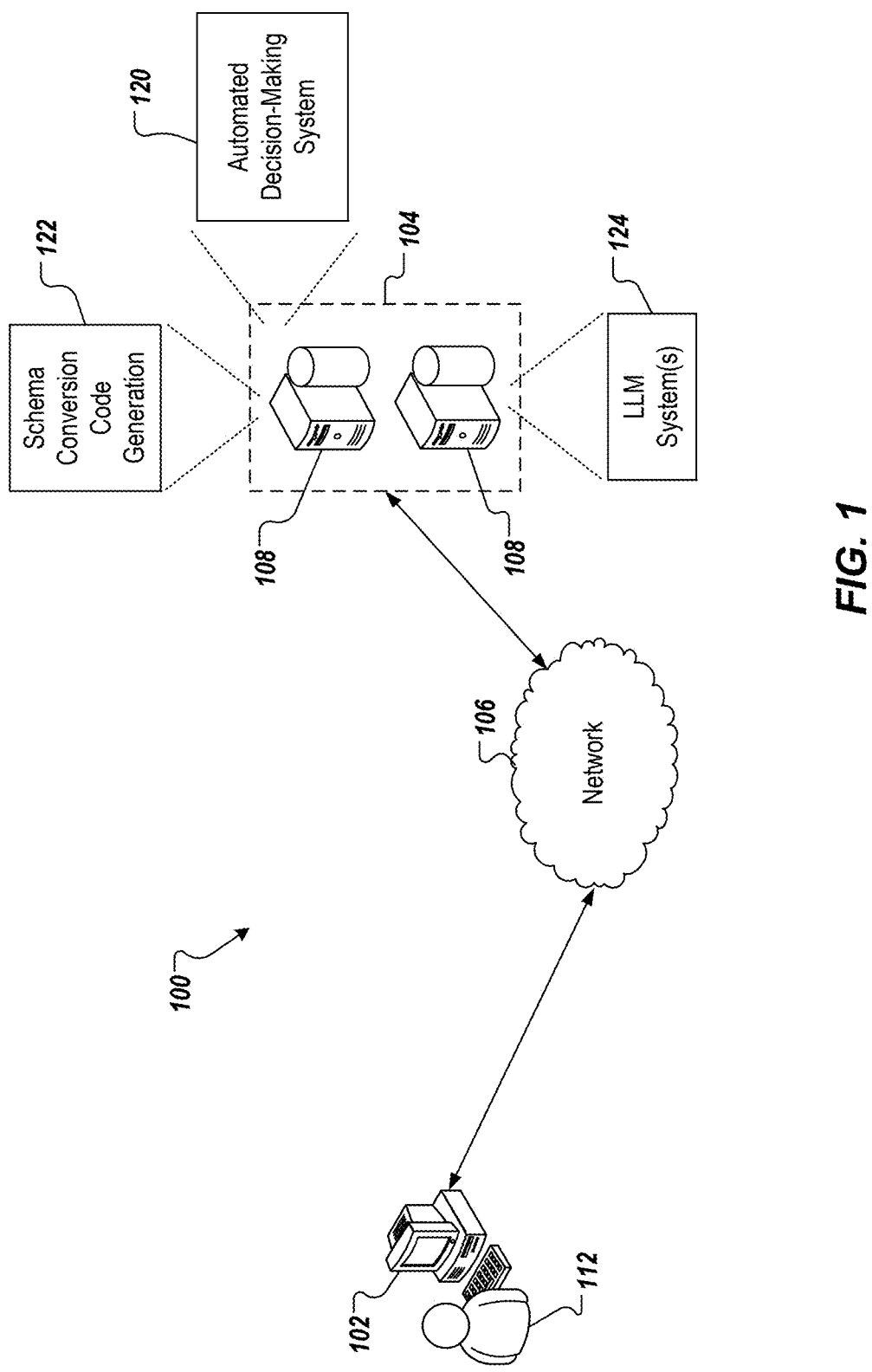
FIG. 1 depicts an example architecture that can be used to execute implementations of the present disclosure.

Implementations of the present disclosure are directed to managing disparate data schemas in machine learning (ML)-based automated decision-making systems. More particularly, implementations of the present disclosure are directed to leveraging one or more large language models (LLMs) to generate computer-executable schema conversion code for converting documents in source data schemas to target data schemas for processing in ML-based automated decision-making systems.

Implementations can include actions of receiving a first source data schema (SDS) representing a first format for recording data in a computer-readable document, providing a first prompt including at least a portion of the first SDS, generating description data by processing the first prompt using a first LLM, providing a second prompt including of at least a portion of the first SDS, at least a portion of a first target data schema (TDS), and the description data, generating first schema conversion code (SCC) by processing the second prompt using a second LLM, converting a first document from the first SDS to the first TDS using the first SCC, processing the first document in the first TDS using a ML model to provide inference results, and automatically executing one or more tasks responsive to the inference results.

To provide context for implementations of the present disclosure, enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using ML systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

The problem of matching entities represented by computer-readable records (electronic documents) appears in many contexts. Example contexts can include matching product catalogs, deduplicating a materials database, and matching incoming payments from a bank statement table to open invoices. Implementations of the present disclosure are described in further detail with reference to an example problem space that includes the domain of finance and matching bank statements to invoices. More particularly, implementations of the present disclosure are described with reference to the problem of, given a bank statement (e.g., a computer-readable electronic document recording data representative of a bank statement), enabling an autonomous system using a ML model to determine one or more invoices (e.g., computer-readable electronic documents recording data representative of one or more invoices) that are represented in the bank statement. It is contemplated, however, that implementations of the present disclosure can be realized in any appropriate problem space.

Technologies related to artificial intelligence (AI) and ML, AI and ML being used interchangeably herein, have been widely applied in various fields. For example, ML-based decision systems can be used to make decisions on subsequent tasks. With reference to the example context, an ML-based decision system can be used to determine matches between bank statements and invoices. For example, invoices can be cleared in an accounting system by matching invoices to one or more line items in bank statements. In other contexts, decisions on treatment courses of patients (e.g., prescribe/not prescribe a drug) and/or decisions on whether to approve customers for loans can be made based on output of ML-based decision systems. In general, an output of a ML-based decision system can be referred to as a prediction or an inference result. However, the use of ML model in decision systems present unique challenges that did not previously exist in the pre-ML world.

For example, enterprise systems often need to match items (queries) from one table to one or more items (targets) in another table within a database system, matching is based on inherent relationships within the data. This is referred to as line-item matching. A ML model, referred to as a generic line-item matching (GLIM) model, can be employed to achieve this matching task. For example, a GLIM model is provided as a classifier that is trained to predict entity pairs to a fixed set of class labels ($\vec{l}$) (e.g., $l_0, l_1, l_2$). For example, the set of class labels ($\vec{l}$) can include 'no match' ($l_0$), 'single match' ($l_1$), and 'multi match' ($l_2$). In some examples, the ML model is provided as a function $f$ that maps a query entity ($\vec{a}$) and a target entity ($\vec{b}$) into a vector of probabilities ($\vec{p}$) (also called 'confidences' in the deep learning context) for the labels in the set of class labels. This can be represented as:

$$f(\vec{a}, \vec{b}) = \begin{pmatrix} p_0 \\ p_1 \\ p_2 \end{pmatrix}$$

where $\vec{p} = \{p_0, p_1, p_2\}$. In some examples, $p_0$ is a prediction probability (also referred to herein as confidence c) of the item pair $\vec{a}, \vec{b}$ belonging to a first class (e.g., no match), $p_1$ is a prediction probability of the item pair $\vec{a}, \vec{b}$ belonging to a second class (e.g., single match), and $p_2$ is a prediction probability of the item pair $\vec{a}, \vec{b}$ belonging to a third class (e.g., multi match).

Here, $p_0$, $p_1$, and $p_2$ can be provided as numerical values indicating a likelihood (confidence) that the item pair $\vec{a}, \vec{b}$ belongs to a respective class. In some examples, the ML model can assign a class to the item pair $\vec{a}, \vec{b}$ based on the values of $p_0$, $p_1$, and $p_2$. In some examples, the ML model can assign the class corresponding to the highest value of $p_0$, $p_1$, and $p_2$. For example, for an entity pair $\vec{a}, \vec{b}$, the ML model can provide that $p_0=0.13$, $p_1=0.98$, and $p_2=0.07$. Consequently, the ML model can assign the class 'single match' ($l_1$) to the item pair $\vec{a}, \vec{b}$.

In general, GLIM models are accurate and robust when there is sufficient, high quality training data available for training. When training data includes all possible data schemas and data relations that can be present during inference, the performance of a GLIM model is optimal. However, in many cases, a sufficient amount of training data and/or the quality of training data are lacking. For example, the training data may be absent representation of the variance in data schemas that are expected to be seen during inference. More particularly, variability in data schemas can arise because different entities (e.g., enterprises, countries, regions) can use disparate data schemas in documents that are to be matched. For example, each document expected to be processed by the GLIM model can have a unique data schema characterized by regional or company-specific practices, leading to inconsistencies and inefficiencies when the documents are processed by the GLIM model.

This can be mitigated through programmatic approaches or manual processes to preprocessing documents for inference. However, such approaches are inefficient in terms of time and technical resources and, hence, are impractical. This can also be mitigated through provisioning of entity- and/or region-specific ML models, as opposed to a generalized ML model. This, however, amplifies consumption of time and technical resources, as multiple disparate ML models need to be trained and maintained, consuming processing, memory, and the like.

In view of the above context, implementations of the present disclosure provide approaches to managing disparate data schemas in ML-based automated decision-making systems. More particularly, implementations of the present disclosure are directed to leveraging one or more LLMs to generate computer-executable schema conversion code for converting documents in a source data schema to a target data schema for processing in a ML-based automated decision-making system. As described in further detail herein, a schema conversion code generation system enables understanding of disparate data schemas and transforming source data schemas into a target data schema. This process involves tasks such as data cleaning, and column renaming, which ensure the quality and consistency of the input data. By integrating implementations of the present disclosure into ML-based automated decision-making systems, such as a GLIM model-based document matching workflow, a wide range of data schemas can be automatically handled. In this manner, the data processing pipeline is accelerated during inference and debugging processes of the ML model pipelines are streamlined. Further, a significant reduction in time and technical resources is achieved, along with obviating human intervention in data preparation. As such, the overall efficiency and accuracy of the document matching system are improved.

Implementations of the present disclosure are described in further detail herein with reference to an example application that leverages one or more ML models (e.g., GLIM models) to provide functionality (referred to herein as a ML application). The example application includes SAP Cash Application (CashApp) provided by SAP SE of Walldorf, Germany. CashApp leverages ML models that are trained using a ML framework (e.g., SAP AI Core) to learn accounting activities and to capture rich detail of customer and country-specific behavior. An example accounting activity can include matching payments indicated in a bank statement to invoices for clearing of the invoices. For example, using an enterprise platform (e.g., SAP S/4 HANA), incoming payment information (e.g., recorded in computer-readable bank statements) and open invoice information are passed to a matching engine, and, during inference, one or more ML models predict matches between records of a bank statement and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

Implementations of the present disclosure are described in further detail herein with non-limiting reference to matching bank statement records with invoice records represented in respective electronic documents. It is contemplated, however, that implementations of the present disclosure can be realized for any appropriate data matching tasks (e.g., matching questions to answers, people to products, bank statements to invoices, bank statements to customer accounts).

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provide such services to any number of client devices (e.g., the client device 102 over the network 106).

In accordance with implementations of the present disclosure, the server system 104 can host a ML-based automated decision-making system 120 that predicts matches between entities (e.g., CashApp, referenced by way of example herein) and automatically executes one or more tasks based on the predicted matches. Also in accordance with implementations of the present disclosure, the server system 104 can host a schema conversion code generation system 122 that users, such as the user 112, can interact with to generate schema conversion code. For example, and as described in further detail herein, the schema conversion code generation system 122 leverages one or more LLMs executed within one or more LLM systems 124 to generate schema conversion code. In some examples, the one or more LLMs of the one or more LLM systems 124 can be provided by one or more third-parties (e.g., GPT-4 provided by OpenAI). As described in further detail herein, the schema conversion code can be used by the ML-based automated decision-making system 120 to convert documents from a source data schema to a target data schema for inference (i.e., predicting matches).

Figure 2:
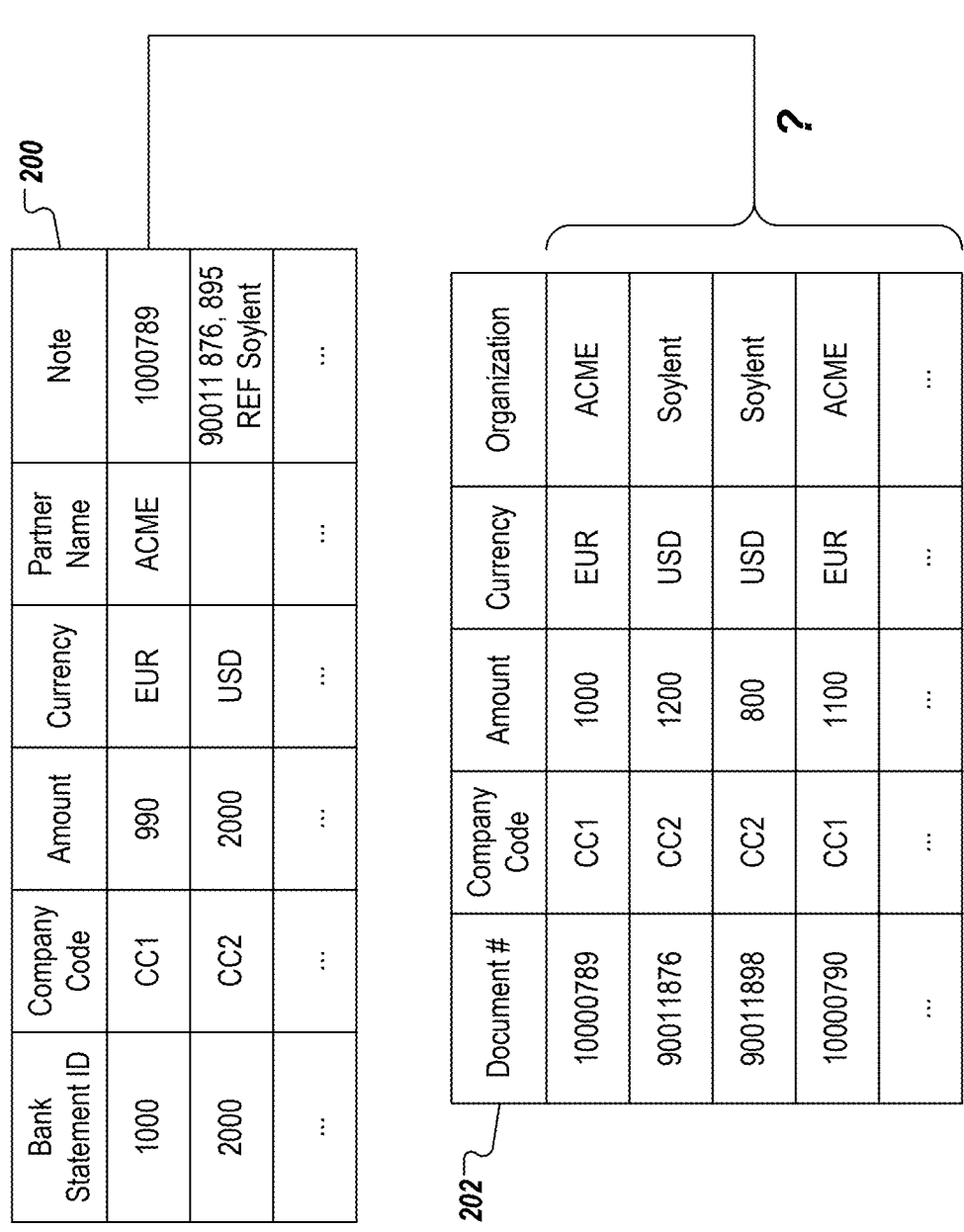
FIG. 2 depicts portions of example electronic documents.

In the example context, FIG. 2 depicts portions of example electronic documents. In the example of FIG. 2, a first electronic document 200 includes a bank statement table that includes records representing payments received, and a second electronic document 202 includes an invoice table that includes invoice records respectively representing invoices that had been issued. In the example context, each bank statement record (bank statement line item) is to be matched to one or more invoice records (invoice line item(s)). Accordingly, the first electronic document 200 and the second electronic document 202 are processed using a ML model, such as a GLIM model, that provides predictions regarding matches between a bank statement record (entity) and one or more invoice records (entity/-ies) (e.g., using CashApp, as described above). In the example of FIG. 2, each of the electronic documents 200, 202 includes a respective data schema. Here, a data schema can include a set of columns, each column having a column name and data type (e.g., text, number, category).

Figure 3:
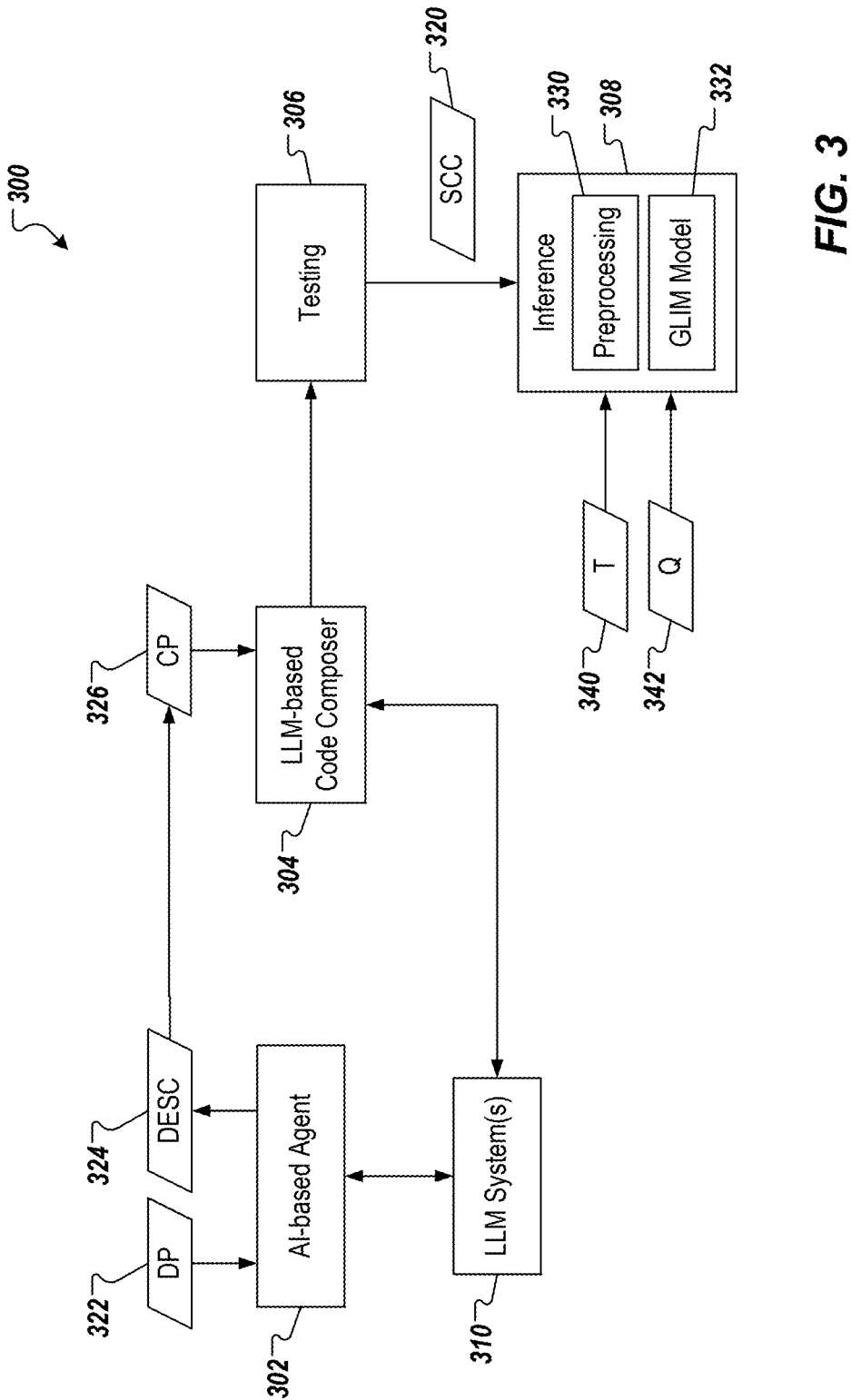
FIG. 3 depicts an example conceptual architecture in accordance with implementations of the present disclosure.

FIG. 3 depicts an example conceptual architecture 300 in accordance with implementations of the present disclosure. In the example of FIG. 3, the conceptual architecture 300 includes an AI-based agent 302, a LLM-based code composer 304, a testing module 306, an inference module 308, and one or more LLM systems 310. In some examples, the schema conversion code generation system of the present disclosure includes the AI-based agent 302, the LLM-based code composer 304, and the testing module 306. As described in further detail herein, the schema conversion code generation system provides schema conversion code (SCC) 320 that is executable by the inference module 308 during inference.

In further detail, a user (e.g., the user 112 of FIG. 1) can interact with the AI-based agent 302 (e.g., using the client device 102) to initiate generation of the SCC 320. In some examples, the AI-based agent 302 is SAP Joule provided by SAP SE of Walldorf, Germany. In some examples, the user provides a prompt 322 to the AI-based agent 302, the prompt 322 including one or more source data schemas (SDSs). In some examples, each SDS includes a data schema of documents that are to be processed by the inference module 308. For example, the user can be an agent of an enterprise that has documents to be processed by the inference module 308, each document recording data using a SDS, which can be enterprise- and/or region specific. In the example context, example SDSs can be provided as:

```
Bank_Statement_Columns=[
    'STMT_KEY': "key",
    'PAYMENTADVICEKEY': "key",
    'CodeOfCompany': "categorical",
    'PaymentAdviceAccount': "text",
    'PaymentAdviceAccountType': "text",
    'PaymentAdvice': "text",
    'PaymentAdviceItem': "text",
    'BankStatementItem': "text",
]
Invoice Columns=[
    'INV KEY': "text",
    'RECEIVABLEKEY': "text",
    'DocumentNumber': "text",
    'PaymentAdviceAltvAccount': "text",
    'PaymentAdviceAltvAccountType': "text",
    'FiscalYear': "numeric",
    'InvoiceCompanyCode': "text"
```

Listing 1: Example Source Data Schemas

In the example of Listing 1, a first SDS is provided for a first document (e.g., bank statement table) and a second SDS is provided for a second document (e.g., invoice table).

In some implementations, the prompt 322 requests that the AI-based agent 302 return natural language, human-readable descriptions of each column of the SDS(s). As such, the prompt 322 can be referred to as a description prompt (DP). In the example context, an example description prompt to the AI-based agent 302 can be provided as:

Imagine you are an assistant. Please discuss with the client to generate human readable descriptions for each column stated in the list provided. For example, you can discuss with the client what each column means and return the information like so:
{"InvoiceCompanyCode": "This column contains company codes retrieved from an invoice document." "DocumentNumber": "This column contains the number found on Accounting Documents" }.

Please start the conversation for explaining the following source data schema: [
    "STMT_KEY",
    "PAYMENTADVICEKEY",
    "CodeOfCompany",
    "PaymentAdviceAccount",
    "PaymentAdviceAccountType",
    "PaymentAdvice",
    "PaymentAdviceItem",
    "BankStatementItem"

Listing 2: Example Description Prompt

In some examples, the AI-based agent 302 interacts with a LLM of the one or more LLM systems 310 to provide description data 324. For example, the description prompt, or at least a portion thereof, is processed by the LLM to generate the description data 324. The description data 324 provides, for each column of a SDS, a human-readable description of data recorded in the column. In the example context, example description data 324 can be provided as:

```
{
    "STMT_KEY": "The unique identifier key for the
        statement, used to uniquely distinguish each entry in
        the database.",
    "PAYMENTADVICEKEY": "A unique key associated
        with a specific payment advice, used for tracking and
        reference purposes.",
    "CodeOfCompany": "A categorical variable represent-
        ing the company code, which categorizes companies
        into different groups based on certain criteria.",
    "PaymentAdviceAccount": "Text information repre-
        senting the account details associated with the pay-
        ment advice, such as account number or account
        holder's name.",
    "PaymentAdviceAccountType": "Text information
        indicating the type of the payment advice account,
        such as checking, savings, or credit.",
    "PaymentAdvice": "Textual description of the payment
        advice, detailing the purpose or nature of the pay-
        ment.",
    "PaymentAdviceItem": "Specific item or detail within
        a payment advice, which could refer to individual
        transactions or components of the payment advice.",
    "BankStatementItem": "Text describing individual
        items on a bank statement, which could include
        transactions like deposits, withdrawals, or charges."
}
```

Listing 3: Example Description Data

In some implementations, the user provides a prompt 326 to the LLM-based code composer 304, the prompt including the SDS(s), the description data 324, and one or more target data schemas (TDSs). In some examples, each TDS is provided as a standardized data schema for documents to be processed by the inference module 308. For example, each TDS can represent a data schema of documents that were used for training of a GLIM model 332 executed by the inference module 308. In the example context, example TDSs can be provided as:

```
Bank_Statement_Columns=[
    'STMT_KEY': "key",
    'PAYMENTADVICEKEY': "key",
    'COMPANYCODE': "categorical",
    'PaymentAdviceAccount': "text",
    'PaymentAdviceAccountType': "text",
```

```
    'PaymentAdvice': "text",
    'PaymentAdviceItem': "text",
    'BankStatementItem': "text",
]
Invoice Columns=[
    'INV KEY': "text",
    'RECEIVABLEKEY': "text",
    'AccountingDocument': "text",
    'PaymentAdviceAltvAccount': "text",
    'PaymentAdviceAltvAccountType': "text",
    'FiscalYear': "numeric",
    'AlternativeCompanyCode': "text"
]
```

Listing 4: Example Target Data Schemas

In the example of Listing 4, a first TDS is provided for a first document (e.g., bank statement table) and a second TDS is provided for a second document (e.g., invoice table). In comparing the example SDSs of Listing 1 to the example TDSs of Listing 4, it can be seen that there are discrepancies (e.g., CodeOfCompany in the SDS, COMPANYCODE in the TDS; DocumentNumber in the SDS, AccountingDocument in the TDS).

In some implementations, the prompt 326 requests that the LLM-based code composer 304 return schema conversion code that is computer-executable to convert documents in a SDS to a TDS. As such, the prompt 326 can be referred to as a code prompt (CP). In the example context, an example code prompt to the LLM-based code composer 304 can be provided as:

Imagine you are an assistant. You should help write some schema conversion code from the source data schema to the target data schema. The code should be written in Python. The input parameter and output should be both Pandas DataFrame.

The schema of the bank statement in Japan(source schema) is similar to:

```
Bank_Statement_Columns=[
    'STMT_KEY_JP': "key", #the Japan bank statement key
    'PAYMENTADVICEKEY_JP': "key", #the Japan payment advice key
    'CCODE': "categorical", #company code
    'PAAccountNo': "text", #the payment advice account
    'PAAccountType': "text", #the payment advice account type
    'PA_JP': "text", #the payment advice
    'PAItem': "text", #the payment advice item
    'BSItem': "text", #the bank statement item
]
```

Please help write code to convert to the standardized schema like:

```
Bank_Statement_Columns=[
    'STMT_KEY': "key",
    'PAYMENTADVICEKEY': "key",
    'COMPANYCODE': "categorical",
    'PaymentAdviceAccount': "text",
    'PaymentAdviceAccountType': "text",
    'PaymentAdvice': "text",
    'PaymentAdviceItem': "text",
    'BankStatementItem': "text",
]
```

Please try your best to map the column based on its semantic meaning.

Listing 5: Example Description Prompt

In some examples, the LLM-based code composer 304 interacts with a LLM of the one or more LLM systems 310 to provide the SCC 320. For example, the code prompt, or at least a portion thereof, is processed by the LLM to generate the SCC 320. In the example context, the SCC 320 can be provided as:

```
df_output=df_input.rename(columns={
    "DocumentNumber": "AccountingDocument",
    "InvoiceCompanyCode": "AlternativeCompanyCode"
} df_input is the input dataframe
df_ouput is the output dataframe
```

Listing 6: Example Schema Conversion Code

In some examples, the LLM-based code composer 304 also returns documentation that describes the transformations are applied by the SCC 320, when the SCC 320 is executed. In this manner, users can understand how data is standardized through conversion from the SDS to the TDS.

In some implementations, the SCC 320 is tested by the testing module 306 prior to deployment for production use by the inference module 308. In some examples, the testing module 306 performs testing for schema validation and data type validation and provides validation reports. In some examples, schema validation is executed to validate the format of the output schema created by the SCC 320. This can include, for example, ensuring no misspelling or misuse of any columns or naming conventions. In some examples, data type validation can include checking to ensure that data types specified in the output schema align with the expected types in the target data schema. In some examples, the validation reports are generated after testing to ensure proper documentation of the schema validation and data type checks. The validation reports are accessible by users (e.g., developers), such that any issues can be manually resolved. More particularly, testing can include using a dummy document that follows the source schema to simulate real-world scenarios. The dummy document can be processed using the SCC, which maps fields from the source to an output schema while applying transformation logic. The output schema is compared to the target schema to ensure alignment of field names, data types, and constraints. Validation reports are generated to highlight any discrepancies, such as mismatched data types or missing fields, and developers access these reports to refine the prompt.

In some implementations, the SCC 320 is deployed to the inference module 308 for production use during inference. For example, if the SCC 320 is validated through testing, the SCC 320 is deployed to the inference module 308. While a single SCC 320 is depicted in FIG. 3, it is contemplated that multiple SCCs can be provided to enable transformation of respective SDSs to respective TDSs. For example, a first SCC can be provided for a first document (e.g., bank statement table) and a second SCC can be provided for a second document (e.g., invoice table).

In some implementations, the SCC(s) is/are executed by a preprocessing sub-module 330 that converts documents from one or more SDSs to one or more TDSs prior to processing by the GLIM model 332. For example, during inference, a ML-based automated decision-making system can use the inference module 308 for matching items of a target document 340 (e.g., line items of a bank statement table) to items of a query document 342 (e.g., line items of an invoice table). In some examples, the target document 340 is provided in a first SDS and the query document is provided in a second SDS. In some examples, the preprocessing sub-module 330 executes a first SCC to transform the target document 340 from a first SDS to a first TDS and executes a second SCC to transform the query document 342 from a second SDS to a second TDS. For example, the second SCC can be executed to convert a column name of the query document from InvoiceCompanyCode of the second SDS to AlternativeCompanyCode of the second TDS. After preprocessing, the target document 340 and the query document 342 are provided in respective TDSs. After preprocessing, the target document 340 and the query document 342 are processed by the GLIM model 332.

As described herein, the inference module 308 can provide a inference results that includes matches between items in the target document 340 to items in the query document 342. In some examples, the ML-based automated decision-making system can perform one or more tasks in response to the inference results. For example, and in the example context, invoices that have been matched to bank statement line items can be automatically cleared within an accounting system. As another example, invoices that have not been matched to bank statement line items can be flagged for further processing (e.g., more rigorous ML-based matching, manual intervention).

Figure 4A:
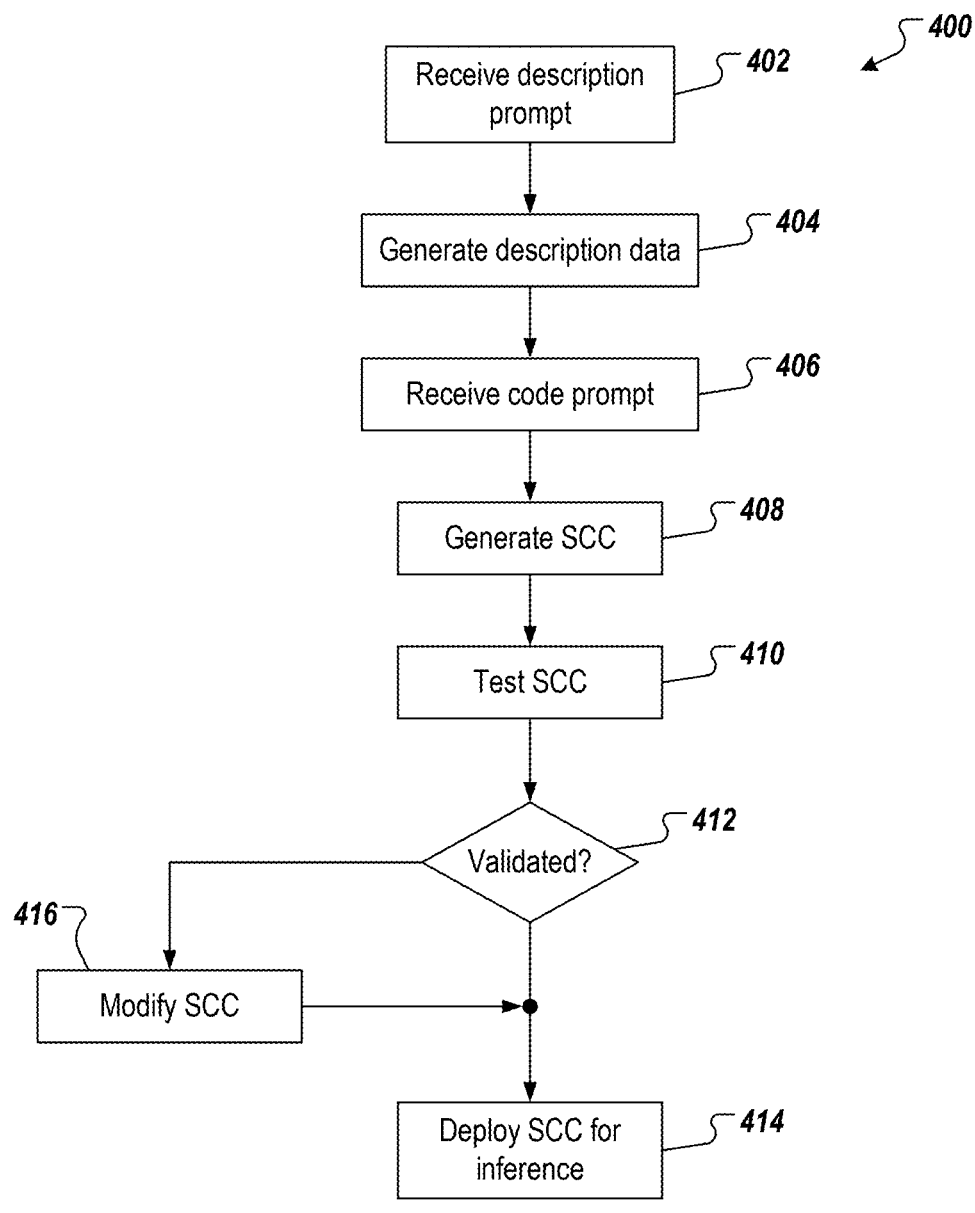
FIGS. 4A and 4B depict example processes that can be executed in accordance with implementations of the present disclosure.

FIG. 4A depicts an example process 400 that can be executed in accordance with implementations of the present disclosure. In some examples, the example process 400 is provided using one or more computer-executable programs executed by one or more computing devices.

A description prompt is received (402). For example, and as described herein with reference to FIG. 3, a user can provide the prompt 322 to the AI-based agent 302. In some examples, the prompt 322 including one or more SDSs and a request to provide a human-readable description for each column of the SDS(s). Description data is generated (404). For example, and as described herein, the AI-based agent 302 interacts with a LLM of the one or more LLM systems 310 to provide description data 324. For example, the description prompt, or at least a portion thereof, is processed by the LLM to generate the description data 324.

A code prompt is received (406). For example, and as described herein, the user provides the prompt 326 to the LLM-based code composer 304, the prompt including the SDS(s), the description data 324, and one or more TDSs. The prompt 326 requests that the LLM-based code composer 304 return schema conversion code that is computer-executable to convert documents in a SDS to a TDS. SCC is generated (408). For example, and as described herein, the LLM-based code composer 304 interacts with a LLM of the one or more LLM systems 310 to provide the SCC 320. For example, the code prompt, or at least a portion thereof, is processed by the LLM to generate the SCC 320. The SCC is tested (410). For example, and as described herein, the SCC 320 is tested by the testing module 306 prior to deployment for production use by the inference module 308. In some examples, the testing module 306 performs testing for schema validation and data type validation and provides validation reports.

It is determined whether the SCC has been validated (412). For example, and as described herein, it is determined whether the format of the output schema created by the SCC 320 (e.g., correct spelling and use of columns and/or naming conventions) is valid and checking to ensure that data types specified in the output schema align with the expected types in the TDS. If the SCC has been validated, the SCC is deployed for inference (414). For example, and as described herein, the SCC 320 is provided to the inference module 308 for processing by the preprocessing sub-module 330 during inference. If the SCC has not been validated, the SCC is modified (416) and deployed for inference (414). For example, and as described herein, a user (e.g., developer) can be alerted to deficiencies of the SCC 320, such that the SCC 320 can be manually and/or programmatically corrected for deployment.

Figure 4B:
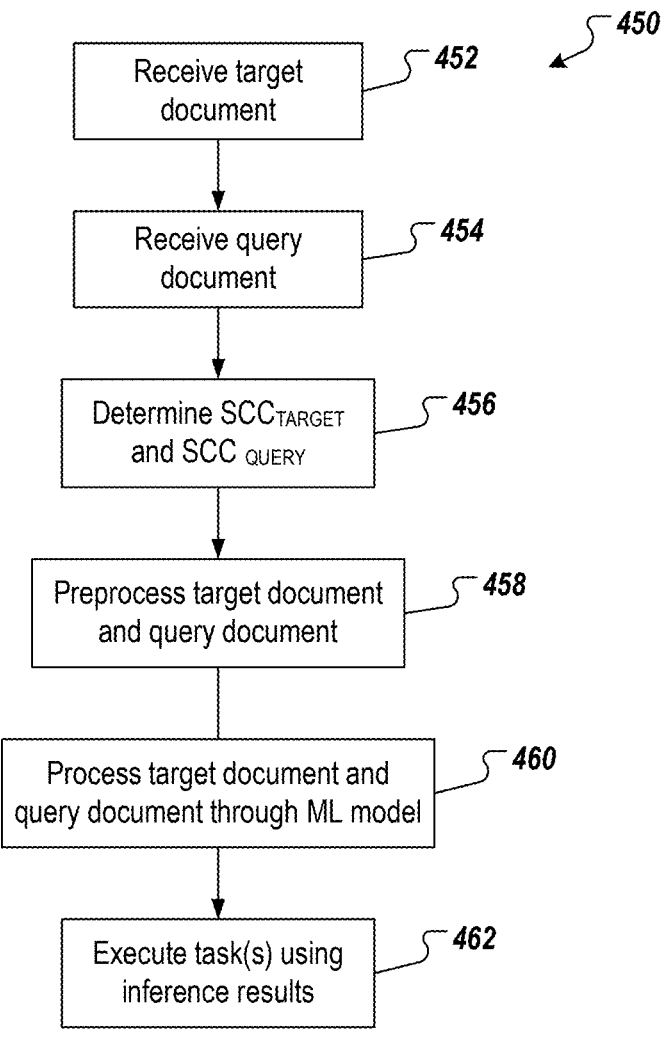

FIG. 4B depicts an example process 450 that can be executed in accordance with implementations of the present disclosure. In some examples, the example process 450 is provided using one or more computer-executable programs executed by one or more computing devices.

A target document is received (452) and a query document is received (454). For example, and as described herein, the target document 340 and the query document 342 can be received by the inference module 308 for matching items of the target document 340 (e.g., line items of a bank statement table) to items of the query document 342 (e.g., line items of an invoice table). In some examples, the target document 340 is provided in a first SDS and the query document is provided in a second SDS. A SCC for the target document (SCC$_{TARGET}$) and a SCC of the query document (SCC$_{QUERY}$) are determined (456). For example, the target document 340 can be associated with a first identifier that uniquely identifies the first SDS and the query document 342 can be associated with a second identifier that uniquely identifies the second SDS. In some examples, the first identifier and the second identifier can be used as indexes to a look-up table to determine SCC$_{TARGET}$ and SCC$_{QUERY}$ from a set of SCCs.

The target document and the query document are preprocessed (458). For example, and as described herein, the preprocessing sub-module 330 executes SCC$_{TARGET}$ to transform the target document 340 from the first SDS to a first TDS and executes SCC$_{QUERY}$ to transform the query document 342 from the second SDS to a second TDS. In this manner, the target document 340 and the query document 342 are provided in respective TDSs.

It can occur that a document is already in a TDS. For example, a unique identifier associated with the document can indicate that the document is in the TDS. In such cases, conversion of the data schema is not needed. As such, no SCC is provided for the document and no preprocessing of the document is performed.

The target document and the query document are processed through a ML model (460). For example, and as described herein, the target document 340 and the query document 342 are processed by the GLIM model 332, which generates inference results that includes matches between items in the target document 340 to items in the query document 342. One or more tasks are executed using the inference results (462). For example, and as described herein, the ML-based automated decision-making system can perform one or more tasks in response to the inference results. For example, and in the example context, invoices that have been matched to bank statement line items can be automatically cleared within an accounting system. As another example, invoices that have not been matched to bank statement line items can be flagged for further processing (e.g., more rigorous ML-based matching, manual intervention).

Implementations of the present disclosure provide one or more technical advantages. As described in detail herein, implementations of the present disclosure leverage LLMs for dynamic adaptation of data schemas. For example, LLMs interpret and transform user-provided data into a standardized format that aligns with a predefined data structure, ensuring consistency and compatibility of data schemas across diverse datasets. In some examples, implementations of the present disclosure conserve time and technical resources that would otherwise be required for, for example, manual data preparation. This not only obviates encroachment of manual errors, but also enhances efficiency and productivity of ML model development and deployment. Further, implementations of the present disclosure enhance predictive accuracy, efficiency, and flexibility of ML models. For example, LLM-based data preprocessing ensures that input data is accurately and consistently transformed into a standardized format, thereby improving the predictive accuracy, efficiency, and flexibility of the ML model. Further, implementations of the present disclosure enable a ML model to be used for processing of documents across a range of disparate data schemas. In this manner, the need for multiple, entity- and/or region-specific ML models is obviated, further conserving technical resources that would otherwise be expended for training and maintaining the multiple, entity- and/or region-specific ML models.

Figure 5:
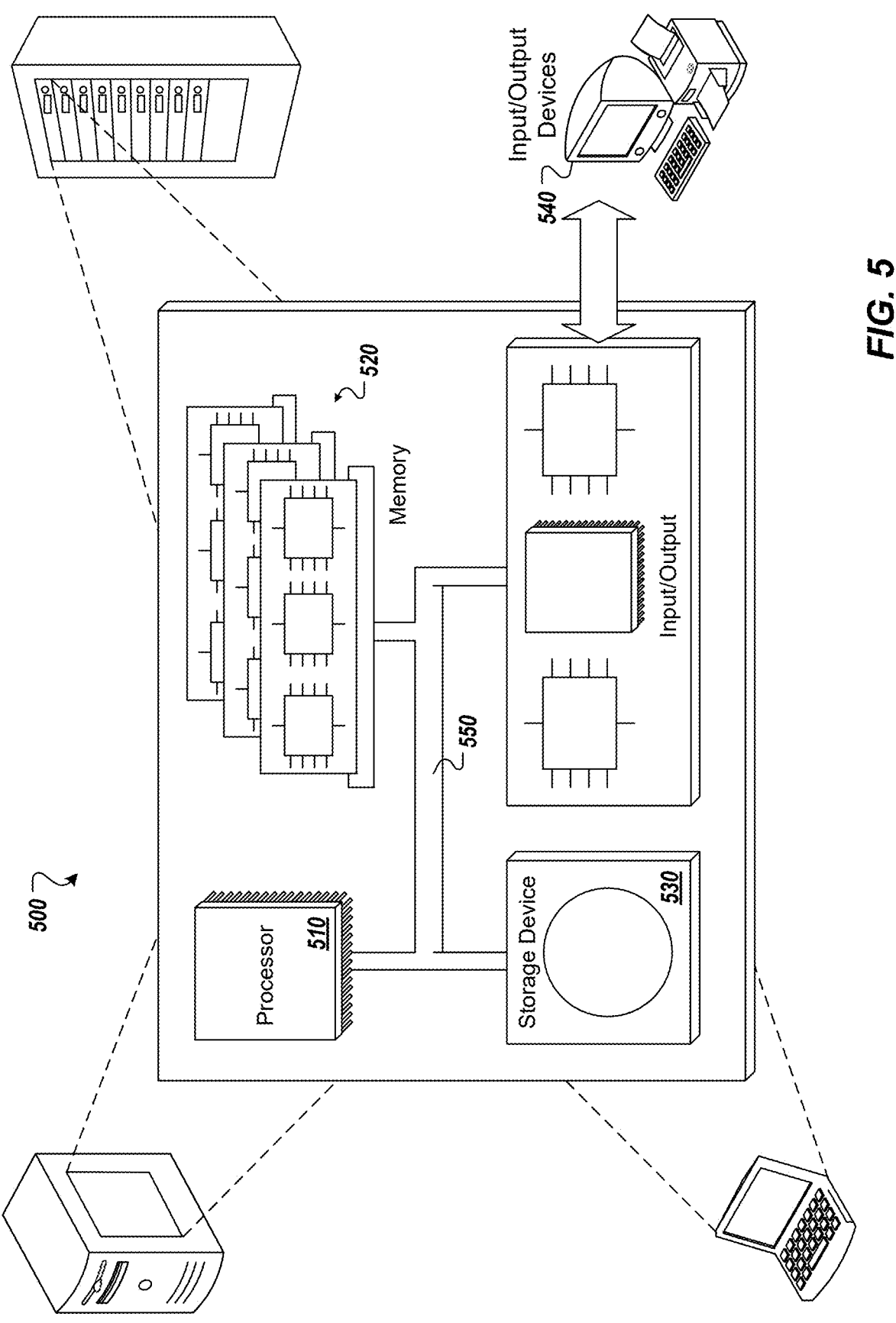
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for computer-executed entity matching using one or more machine learning (ML) models, the method being executed by one or more processors and comprising:

receiving a first source data schema (SDS) representing a first format for recording data in a computer-readable document;

providing a first prompt comprising at least a portion of the first SDS;

generating description data by processing the first prompt using a first large language model (LLM);

providing a second prompt comprising of at least a portion of the first SDS, at least a portion of a first target data schema (TDS), and the description data;

generating first schema conversion code (SCC) by processing the second prompt using a second LLM;

converting a first document from the first SDS to the first TDS using the first SCC;

processing the first document in the first TDS using a ML model to provide inference results; and automatically executing one or more tasks responsive to the inference results.

2. The method of claim 1, wherein converting the first document from the first SDS to the first TDS comprises changing a column name of the first document.

3. The method of claim 1, wherein the first prompt comprises a request to generate descriptions for each column in a set of columns of the first SDS.

4. The method of claim 1, wherein the second prompt comprises a request to generated the first SCC based on the at least a portion of the first SDS, the at least a portion of a first TDS, and the description data.

5. The method of claim 1, wherein the inference results are provided by the ML model further based on a second document in a second TDS.

6. The method of claim 5, further comprising converting the second document from a second SDS to the second TDS using second SCC.

7. The method of claim 1, wherein the ML model comprises a generic line-item matching (GLIM) model that predicts matches between line items of the first document to line items of a second document.

8. A non-transitory computer-readable storage medium coupled to one or more processors and having instructions stored thereon which, when executed by the one or more processors, cause the one or more processors to perform operations for computer-executed entity matching using one or more machine learning (ML) models, the operations comprising:

receiving a first source data schema (SDS) representing a first format for recording data in a computer-readable document;

providing a first prompt comprising at least a portion of the first SDS;

generating description data by processing the first prompt using a first large language model (LLM);

providing a second prompt comprising of at least a portion of the first SDS, at least a portion of a first target data schema (TDS), and the description data;

generating first schema conversion code (SCC) by processing the second prompt using a second LLM;

converting a first document from the first SDS to the first TDS using the first SCC;

processing the first document in the first TDS using a ML model to provide inference results; and automatically executing one or more tasks responsive to the inference results.

9. The non-transitory computer-readable storage medium of claim 8, wherein converting the first document from the first SDS to the first TDS comprises changing a column name of the first document.

10. The non-transitory computer-readable storage medium of claim 8, wherein the first prompt comprises a request to generate descriptions for each column in a set of columns of the first SDS.

11. The non-transitory computer-readable storage medium of claim 8, wherein the second prompt comprises a request to generated the first SCC based on the at least a portion of the first SDS, the at least a portion of a first TDS, and the description data.

12. The non-transitory computer-readable storage medium of claim 8, wherein the inference results are provided by the ML model further based on a second document in a second TDS.

13. The non-transitory computer-readable storage medium of claim 12, wherein operations further comprise converting the second document from a second SDS to the second TDS using second SCC.

14. The non-transitory computer-readable storage medium of claim 8, wherein the ML model comprises a generic line-item matching (GLIM) model that predicts matches between line items of the first document to line items of a second document.

15. A system, comprising:

a computing device; and a computer-readable storage device coupled to the computing device and having instructions stored thereon which, when executed by the computing device, cause the computing device to perform operations for computer-executed entity matching using one or more machine learning (ML) models, the operations comprising:

receiving a first source data schema (SDS) representing a first format for recording data in a computer-readable document;

providing a first prompt comprising at least a portion of the first SDS;

generating description data by processing the first prompt using a first large language model (LLM);

providing a second prompt comprising of at least a portion of the first SDS, at least a portion of a first target data schema (TDS), and the description data;

generating first schema conversion code (SCC) by processing the second prompt using a second LLM;

converting a first document from the first SDS to the first TDS using the first SCC;

processing the first document in the first TDS using a ML model to provide inference results; and automatically executing one or more tasks responsive to the inference results.

16. The system of claim 15, wherein converting the first document from the first SDS to the first TDS comprises changing a column name of the first document.

17. The system of claim 15, wherein the first prompt comprises a request to generate descriptions for each column in a set of columns of the first SDS.

18. The system of claim 15, wherein the second prompt comprises a request to generated the first SCC based on the at least a portion of the first SDS, the at least a portion of a first TDS, and the description data.

19. The system of claim 15, wherein the inference results are provided by the ML model further based on a second document in a second TDS.

20. The system of claim 19, wherein operations further comprise converting the second document from a second SDS to the second TDS using second SCC.

* * * * *